Dec. 16, 1952   M. MORGAN ET AL   2,621,734
SHEARING APPARATUS

Filed April 29, 1950   2 SHEETS—SHEET 1

INVENTORS
MYLES MORGAN
ERNEST R. COMTOIS
BY
Albert G. Blodgett
ATTORNEY

Dec. 16, 1952　　　　M. MORGAN ET AL　　　　2,621,734
SHEARING APPARATUS

Filed April 29, 1950　　　　　　　　　　　　2 SHEETS—SHEET 2

INVENTORS
MYLES MORGAN
ERNEST R. COMTOIS
BY
ATTORNEY

Patented Dec. 16, 1952

2,621,734

UNITED STATES PATENT OFFICE 2,621,734

SHEARING APPARATUS

Myles Morgan and Ernest R. Comtois, Worcester, Mass., assignors to Morgan Construction Company, Worcester, Mass., a corporation of Massachusetts Application April 29, 1950, Serial No. 158,994

4 Claims. (Cl. 164—61)

This invention relates to shearing apparatus, and more particularly to apparatus for severing metal bars or the like while they are traveling longitudinally at high speed.

One apparatus commonly employed for this purpose comprises a pair of rotatable vertical cutting disks arranged one above the other at one side of the normal path of travel of the bars and at an oblique angle with the said path. As each bar approaches the disks it is guided along its normal path of travel by a switch device which provides two upright guide surfaces at opposite sides of the bar. When the bar is to be served, the switch device is moved laterally to swing the bar into the "bite" of the cutting disks, and the bar is cut as it passes between the disks.

As this takes place, the bar is given a very sudden lateral movement by the action of the rapidly rotating disks, because of their angular position. Since the switch device is moved at a relatively low speed, the tendency is for the laterally moving bar to strike against the rear edge of one of the upright guide surfaces and produce a sharp bend or hook in the bar somewhat to the rear of the point of severance. This is highly undesirable, particularly since a cobble may result from failure of the bent front end to pass through subsequent guides in the proper manner.

It is accordingly one object of the invention to provide a comparatively simple, inexpensive and dependable apparatus for severing metal bars or the like while they are traveling longitudinally at high speed.

It is a further object of the invention to provide a simple and thoroughly reliable shearing apparatus for severing rapidly traveling metal bars by moving them laterally between two rotating disks, the construction being such as to avoid any appreciable bending of the bars.

With these and other objects in view, as will be apparent to those skilled in the art, the invention resides in the combination of parts set forth in the specification and covered by the claims appended hereto.

In accordance with the invention, there are provided a cutting guide and a separate return guide which provide spaced lateral guide surfaces between which the bars travel longitudinally in a generally horizontal direction. Both these guides are movable laterally and they have normal positions which determine a normal path of travel for the bars. A pair of substantially vertical rotatable cutting disks are mounted one above the other at the same side of the said normal path as the return guide, in a position slightly beyond the return guide and at an oblique angle to said path. The guides are preferably actuated by a reversible motor having mechanical connections with both guides, these connections being effective, upon movement of the motor in one direction, to move the return guide away from the normal path and then to move the cutting guide toward the return guide, thereby deflecting the bar laterally between the disks to sever the bar. Upon movement of the motor in the other direction, the guides are returned to their normal positions. The preferred construction includes a pair of toggle links connected at their outer ends to the respective guides and at their inner ends to one another, and a guideway along which the connected inner ends of the links are moved. This guideway is preferably in the general form of an S with two oppositely curved portions one of which is substantially coaxial with the connection between the cutting guide and the corresponding link when the cutting guide is in its normal position and the other of which is substantially coaxial with the connection between the return guide and the corresponding link when the return guide is in its cutting position, the latter being more remote from the normal path of the bar than the normal position. The inner ends of the links may be moved along the guideway by means of a slotted lever actuated by a reversible fluid motor.

Referring to the drawings illustrating one embodiment of the invention and in which like reference numerals indicate like parts, Fig. 1 is a plan view of a shearing apparatus, with the guides in their normal positions;

Figure 1:
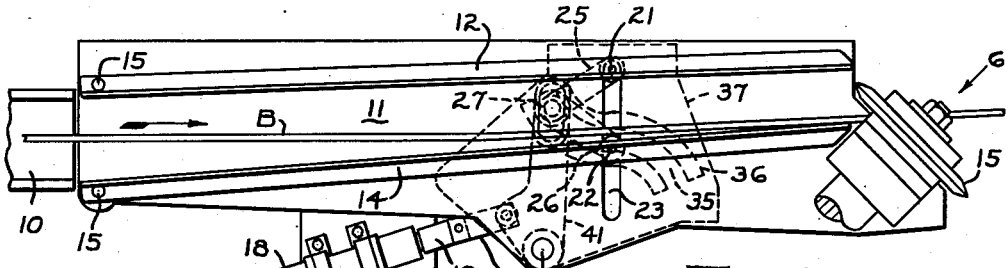

The embodiment illustrated comprises a generally horizontal trough 10 along which a metal bar B or the like travels longitudinally in the direction indicated by the arrows. At the discharge end of the trough there is mounted a generally horizontal plate or table 11 over which the bar travels as it issues from the trough. In passing over the table 11, the bar travels between two horizontally elongated guides 12 and 14 of L-shaped cross section providing spaced lateral guide surfaces for the bar. These guides are movable laterally, and for this purpose they are pivotally secured near their receiving ends to the table 11 by means of upright pivot pins 15. Each of these guides has a normal position, which is illustrated in Fig. 1, such as to determine a normal path of travel for the bar as indicated. For reasons which will appear hereinafter, the guides 12 and 14 may be described respectively as a cutting guide and a return guide.

Figure 3:
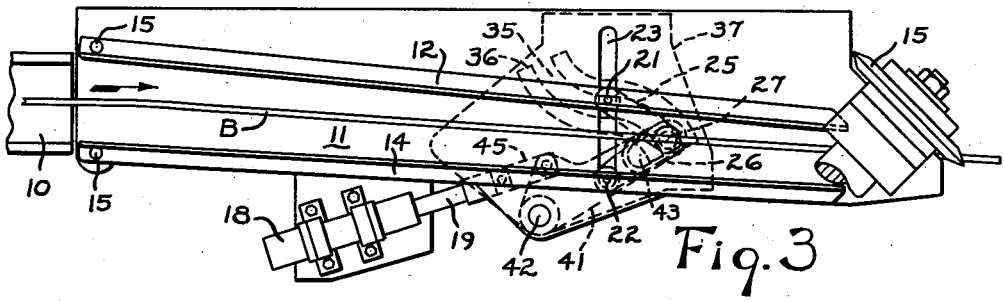
Fig. 3 is a view similar to Fig. 2, but with the cutting guide shifted to its cutting position.
Figure 6:
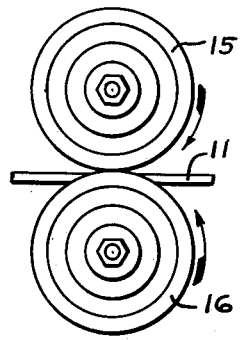
Fig. 6 is an elevation taken as indicated by the arrow 6 in Fig. 1.
Figure 7:
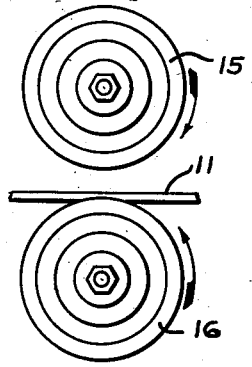
Fig. 7 is an elevation taken as indicated by the arrow 7 in Fig. 4.
Figure 8:
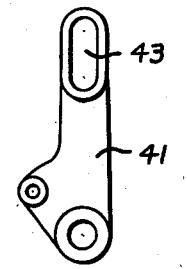
Fig. 8 is a detail plan view of a lever forming a part of the apparatus.

In order that the bar B may be severed when desired, there is provided a pair of substantially vertical rotatable cutting disks 15 and 16 mounted one above the other at the same side of the normal path of the bar as the return guide 14 and slightly beyond the said guide 14. The disks lie at an oblique angle with the path of the bar, and they rotate in opposed directions at a peripheral speed appreciably in excess of the speed of bar travel. Consequently, when the guides 12 and 14 are moved laterally from their normal positions as shown in Fig. 1 to their cutting positions as shown in Fig. 3 the cutting guide 12 will deflect the bar laterally into the bite of the disks 15—16. As this occurs, the bar will be moved very suddenly in a lateral direction between the disks and thereby severed. Upon completion of the cut the disks will be separated, as shown in Fig. 7, and the guides will be returned to their normal positions, thereby causing the rod to pass between the separated disks and be returned to its normal path. Thereupon the disks will be moved together again, as shown in Fig. 6, in readiness for the next cut. Mechanisms for driving the cutting disks and for moving them to and from one another are well known, and it is accordingly considered unnecessary to illustrate such a mechanism herein.

The present invention provides an improved mechanism for actuating the guides 12 and 14, so constructed and arranged that the return guide 14 will be remote from the bar at the time the bar is severed. Hence as the bar is passed rapidly between the disks at the time of the cut, there will be no danger of the bar striking the return guide laterally with sufficient force to damage the bar. This mechanism comprises a reversible motor 18, preferably a double-acting fluid motor having a reciprocable piston rod 19. Mechanical connections are provided between the rod 19 and the guides 12 and 14 effective, when the rod moves in one direction, first to swing the return guide 14 away from the cutting guide 12 and then to swing the cutting guide 12 toward the return guide 14, and when the rod moves in the reverse direction to return both guides to their normal positions.

Figure 5:
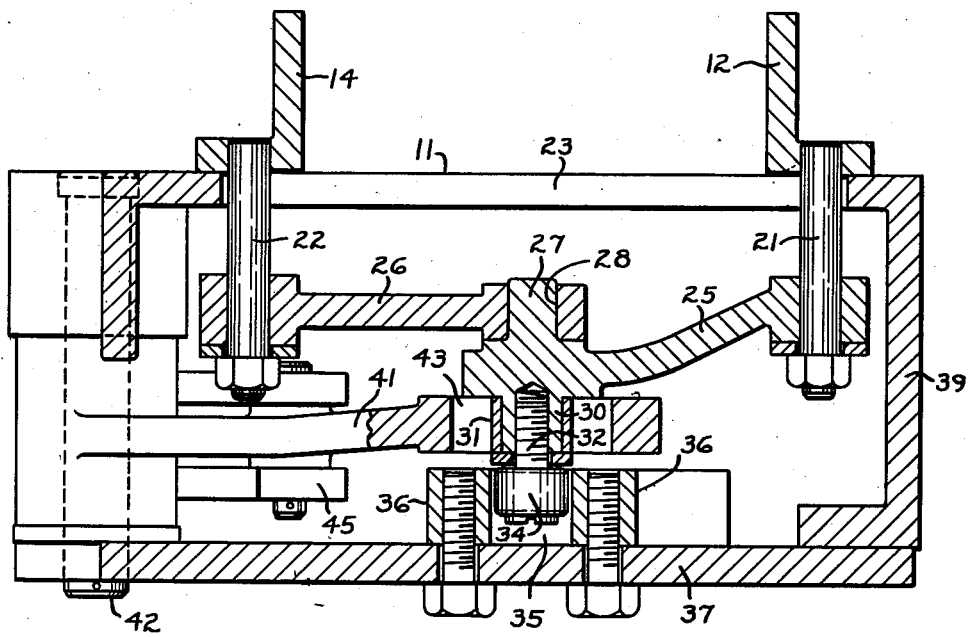
Fig. 5 is an enlarged view in section taken on the line 5—5 of Fig. 2.

The specific mechanical connections illustrated for actuation of the guides 12—14 will now be described. As best shown in Fig. 5, a pin 21 extends downwardly from the guide 12, and a similar pin 22 extends downwardly from the guide 14. These pins are rigidly secured at their upper ends to the respective guides, by welding or otherwise, and they extend through a slot 23 in the plate 11. This slot extends transversely of the path of the bar, so that the pins may travel along the slot as the guides are swung about their pivots 15. Two generally horizontal toggle links 25 and 26 are pivotally connected at their outer ends to the pins 21 and 22 respectively, and at their inner ends to one another. For this purpose the inner end portion of the link 25 is provided with a cylindrical projection 27 integral with the link and extending upwardly through a cylindrical hole 28 in the inner end portion of the link 26. The inner end of the link 25 is further provided with a downwardly extending cylindrical projection 30 integral with the link and coaxial with the projection 27. The projection 30 is surrounded by an annular roller 31, and a vertical screw 32 extends upwardly into this projection 30 in coaxial relation thereto, this screw serving to support a roller 34 located below the roller 31 and in alignment therewith. The lower roller 34 lies within a generally horizontal guideway or groove 35 formed by two spaced bars or ribs 36 suitably fastened to the upper surface of a horizontal plate 37. This plate is secured to a wall portion 39 (Fig. 5) extending downwardly from one side of the upper plate 11.

Figure 2:
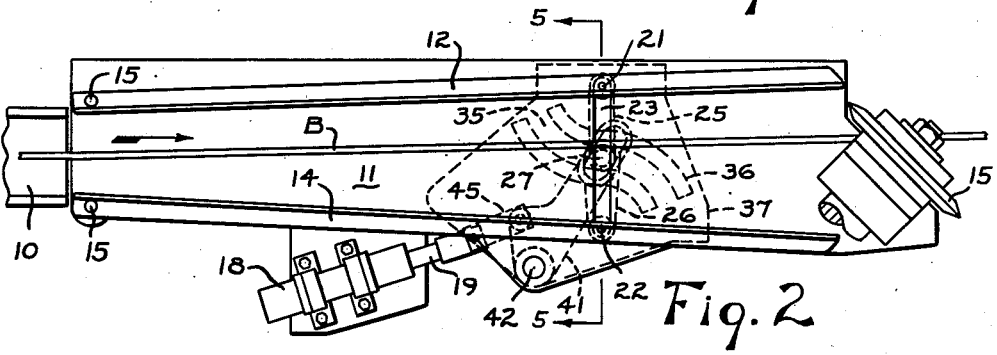
Fig. 2 is a view similar to Fig. 1, but with the return guide shifted to its cutting position.

As best shown in Figs. 1 to 4, the guideway or groove 35 is in the general form of an S, with two oppositely curved arcuate portions. One of these arcuate portions is substantially coaxial with the pin 21 when the corresponding cutting guide 12 is in its normal position (Fig. 1), while the other arcuate portion is substantially coaxial with the pin 22 when the corresponding return guide 14 is in its cutting position (Fig. 2). Consequently, as the roller 34 and the projection 27 thereabove are moved along the guideway 35 from one end thereof to the other, as indicated in Figs. 1 to 3, the link 26 will first move the return guide 14 to its cutting position while the cutting guide 12 remains stationary in its normal position, and immediately thereafter the link 25 will move the cutting guide 12 to its cutting position while the return guide 14 remains stationary. Upon reverse travel of the roller 34 along the guideway 35, both guides 12 and 14 will be returned to their normal positions. This movement of the roller 34 is brought about by means of a horizontal lever 41 which is fulcrumed at one end on a vertical pin 42 supported by the plates 11 and 37, the lever having a slot 43 in its other end of the proper width to receive the roller 31. The lever 41 is connected by a link 45 to the piston rod 19 of the motor 18, so that the motor can swing the lever horizontally in a desired arc of travel which corresponds with the stroke of the piston rod.

Figure 4:
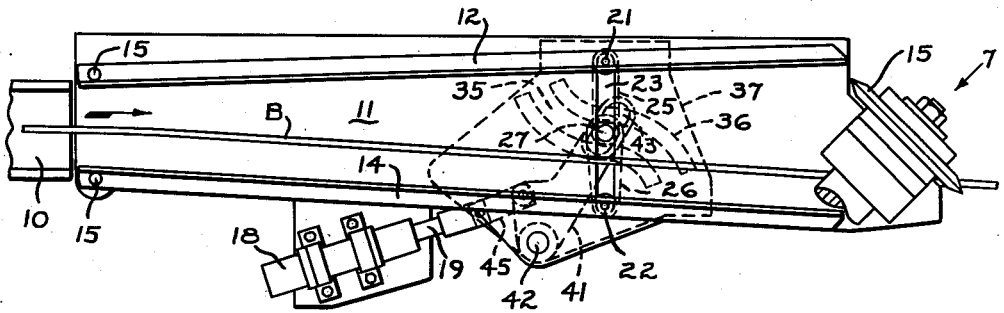
Fig. 4 is a view similar to Fig. 3, but with the cutting guide returned to its normal position.

The operation of the invention will now be apparent from the above disclosure. With the piston rod 19 at the inner end of its stroke, the roller 34 will lie at one end of the guideway 35, and the guides 12 and 14 will both be in their normal positions as shown in Fig. 1. Consequently, the bar B will be guided along its normal path somewhat to one side of the "bite" of the cutting disks 15—16. When the bar is to be severed, the motor 18 will be supplied with pressure fluid under the control of a suitable four-way valve (not shown) so that the piston rod 19 will move on its outward stroke. This will swing the lever 41 in a clockwise direction and cause the roller 34 and the projection 27 to move to the other end of the guideway 35. During the first half of this movement the link 25 will swing about the pin 21 and the cutting guide 12 will remain stationary, while the link 26 will move the return guide 14 away from the bar B and into its cutting position as shown in Fig. 2. During the second portion of the movement of the lever 41, the link 26 will merely swing about the pin 22 and the return guide 14 will remain stationary, while the link 25 will move the cutting guide 12 to its cutting position as shown in Fig. 3. During this movement of the cutting guide 12, it will crowd the bar B laterally into the bite of the rotating disks 15—16, and the instant these disks grip the bar they will draw the bar between themselves, sever it and eject it from the other side without interrupting its forward travel. Since the return guide 14 has been moved to its cutting position and out of the way before the bar is severed, the laterally ejected bar will not strike this guide, and the danger of bending the new front end portion of the severed bar will be avoided. Upon completion of the cut, the disks 15—16 will be separated as indicated in Fig. 7 by suitable mechanism (not shown) and the fluid motor 18 will be energized to cause the piston rod 19 to make its inward stroke. This will swing the lever 41 in a counterclockwise direction and move the roller 34 in the opposite direction along the guideway 35 and back to its original position. During the first half of this movement the link 26 will swing about the pin 22, and the return guide 14 will remain stationary, while the link 25 will move the cutting guide 12 back to its normal position as shown in Fig. 4. During the second part of the movement of the lever 41, the link 26 will move the return guide 14 back to its normal position, this guide crowding the bar B laterally between the separated disks 15—16 and back to its normal path of travel. The disks will then be moved together once more in readiness for the next cut.

Having thus described our invention, what we claim as new and desire to secure by Letters Patent is:

1. Shearing apparatus for severing bars while they are traveling longitudinally in a generally horizontal direction comprising a cutting guide and a separate return guide providing spaced lateral guide surfaces between which the bars travel, the two guides being separately movable laterally and having normal positions which determine a normal path of travel for the bars, a pair of substantially vertical rotatable cutting disks mounted one above the other at the same side of the said normal path as the return guide and at an oblique angle with the said path, a device movable forwardly along a predetermined path, a motor connected to the device to move the same along the predetermined path, connections between the device and the return guide to move the return guide away from the cutting guide as the device moves along the initial portion of the said predetermined path, and connections between the device and the cutting guide to move the cutting guide toward the return guide as the device moves along the final portion of the said predetermined path, thereby deflecting the bar into the bite of the cutting disks to sever the bar.

2. Shearing apparatus as set forth in claim 1, in which the motor is reversible and arranged to move the device rearwardly along the said predetermined path and thereby return both guides to their normal positions.

3. Shearing apparatus for severing bars while they are traveling longitudinally in a generally horizontal direction comprising a cutting guide and a separate return guide providing spaced lateral guide surfaces between which the bars travel, the two guides being movable laterally and having normal positions which determine a normal path of travel for the bars, a pair of substantially vertical rotatable cutting disks mounted one above the other at the same side of the said normal path as the return guide and at an oblique angle with the said path, a pair of generally horizontal toggle links with their outer ends pivotally connected to the respective guides, means pivotally connecting the inner ends of the links to one another, a guideway for the said means having two portions the first of which is arcuate and substantially coaxial with the pivotal connection between the cutting guide and the corresponding link when the cutting guide is in its normal position, the second portion of the guideway being shaped to guide the said means progressively further from the center of curvature of the arcuate portion, and mechanism to move the said means along the guideway and thereby first move the return guide away from the cutting guide and then move the cutting guide toward the return guide to deflect a bar into the bite of the cutting disks to sever the bar.

4. Shearing apparatus for severing bars while they are traveling longitudinally in a generally horizontal direction comprising a cutting guide and a separate return guide providing spaced lateral guide surfaces between which the bars travel, the two guides being movable laterally and having normal positions which determine a normal path of travel for the bars, a pair of substantially vertical rotatable cutting disks mounted one above the other at the same side of the said normal path as the return guide and at an oblique angle with the said path, the return guide having a cutting position which is more remote from the said normal path than its normal position, a pair of generally horizontal toggle links with their outer ends pivotally connected to the respective guides, means pivotally connecting the inner ends of the links to one another, a guideway for the said means in the general form of an S with two oppositely curved arcuate portions one of which is substantially coaxial with the pivoted connection between the cutting guide and the corresponding link when the cutting guide is in its normal position and the other of which is substantially coaxial with the pivotal connection between the return guide and the corresponding link when the return guide is in its cutting position, and mechanism to move the said means along the guideway and thereby actuate the guides.

MYLES MORGAN.
ERNEST R. COMTOIS.

REFERENCES CITED

The following references are of record in the file of this patent:

UNITED STATES PATENTS

| Number | Name | Date |
| --- | --- | --- |
| 2,170,255 | Sheperdson | Aug. 22, 1939 |